ALARM SYSTEM

Filed Feb. 21, 1952 2 Sheets-Sheet 1

Frank Wilton Jones
Earl J. Rueb
INVENTORS.

BY Clarence A. O'Brien
and Harvey B. Jacobson
Attorneys

ALARM SYSTEM

Filed Feb. 21, 1952 2 Sheets-Sheet 2

Frank Wilton Jones
Earl J. Rueb
INVENTORS.

BY Clarence A. O'Brien
and Harvey B. Jacobson
Attorneys

United States Patent Office 2,700,152

Patented Jan. 18, 1955

2,700,152

ALARM SYSTEM

Frank Wilton Jones and Earl J. Rueb, Oklahoma City, Okla.

Application February 21, 1952, Serial No. 272,826

4 Claims. (Cl. 340—224)

This invention relates to alarm signal systems and it has more particularly reference to automatic fire and burglar alarm systems of the type in which a number of protected premises or areas are arranged each of which is provided with alarm circuits and with a transmitter broadcasting a signal upon occurrence of an abnormal condition, closing or opening the alarm circuits, as the case may be, which signal is received at a station which is under permanent supervision so that the occurrence of an alarming condition in any one of the protected areas or premises can be instantly brought to the notice of the proper authorities.

In known installations of this type in which a large number of protected areas or premises report alarming conditions through a single central station difficulties are repeatedly experienced in connection with correct correlation between the signal which is received and the station or protected area from which it is transmitted. The above mentioned difficulties depend upon the nature of the system. The correlation between a received signal and a station is complete and automatic when telephone lines or a special line for each protected area can be used. However, telephone lines are usually not available for any transmission by external apparatus and a special line system is extremely costly in itself and necessitates a complex and elaborate central exchange equipment and a maintenance by experts.

It is therefore preferable to use signals which can be broadcast either along a single line circuit or by means of radio waves. The drawback of such systems is however that they must use elaborate signal systems either with spoken messages requiring the modulation of the waves or with signals sent on different frequencies or the like, or the identification of the station transmitting the signal is produced by other characteristics of the signals but in any case is dependent on the interpretation of these characteristics and on faultless operation of the system. Both factors, however, involve a certain percentage of failures. Moreover, broadcast systems of this type have frequently the drawback that the signals are distorted and that more than one signal cannot be received at one time, so that back signalling becomes necessary to stop the emission of signals after reception in order to stop the interference with other signals. Moreover, reception is quite frequently disturbed or impaired, either by other calls within the system or by outside interference, so that the signals are not always clearly recognizable and in any case have to be interpreted. The number of mistakes which are likely to occur in systems of this type is therefore not negligible. An alarm system however should operate practically without failures.

It may finally be mentioned that it has also been proposed to use a single circuit system in which all stations produce a characteristic signal, transmitted along a single circuit running from protected area to protected area and including the receiver of the supervisory station in which system interference between signals is excluded by providing a delayed operation for any signal which is transmitted while another signal is still on the line. This system, apart from other defects, has the drawback that the number of stations on such a circuit is very limited and that again interpretation of the characteristic signals is necessary for the purpose of identifying a given station.

The invention has for its principal object to provide an alarm system of the type mentioned in which signals are broadcast without modulation or other identifying characteristics so that all signals are alike and come in on the same frequency channel, the identification being automatically produced without interpretation of the signals by the cooperation of electromagnetic and mechanical means in the transmitter and receiver stations produced by an automatic synchronization of the two stations and by a suitable individual selection of the timing or time position of the signals on the time coordinates of said synchronized movement.

A further principal object of the invention consists in providing a system of the type above mentioned in which each transmitter and receiver is equipped with a rotary station identification means and these means are adapted to be started upon closing of an alarm circuit in such a way that a certain relative position between the rotary means is maintained, these means rotating in synchronism during transmission and the identification of the transmitting station being obtained automatically by the angular position of the contacts which operate to produce the signal in the transmitter and by the corresponding position of the contacts in the receiver.

Another principal object of the invention consists in providing a system of the type mentioned in which identical signals may be broadcast through the same channel by all stations and in which interference between the signals is excluded partly by broadcasting the signals only at definite moments and partly also by providing the station identification means with further means for producing a pause of definite length in which no transmission can occur between the transmission periods, such pause being preferably provided during each revolution of the station identification means, and said pause permitting reception of any further signals which may accidentaly have been transmitted simultaneously with the first signal.

A further principal object of the invention consists in a system of the type above mentioned in which several types of signals (for instance, fire alarm signals, burglar alarm signals and other alarm signals) are sent by the same station and are also identified by the means described which consists in assigning to two contacts or other means producing the signal a definite angular position on the rotary station identification means, thus producing a double identification, partly relating to the station which is transmitting and partly relating to the nature of the signal in each of the stations.

While the principal or general objects of the invention have been above explained, it will be clear from the following specification that a number of more specific and ancillary objects are attained which will be explained in the following specification.

The invention is illustrated in the accompanying drawing showing one embodiment thereof. It is however to be understood that the embodiment illustrated in the drawing is merely shown by way of example in order to explain the principle of the invention and the best mode of applying said principle. Other modifications may as well serve the purpose, as explained, and may operate in the same manner and a departure from the construction and from the connections shown in the diagrams is therefore not necessarily a departure from the principle of the invention.

As has been explained above the system according to this invention provides that a large number of unmanned, protected areas or premises, each equipped with a signal transmitter operating automatically should cooperate with a single permanently attended alarm receiving station. The signals transmitted from the protected areas or premises, according to the invention, are unmodulated signals which are all of the same frequency and identification of the transmitting station in the receiving station is automatically performed by the use of identification or code wheels, as described below.

In addition to the identification of the station also the nature of the disturbance in each station has to be identified.

Figures 1, 2:
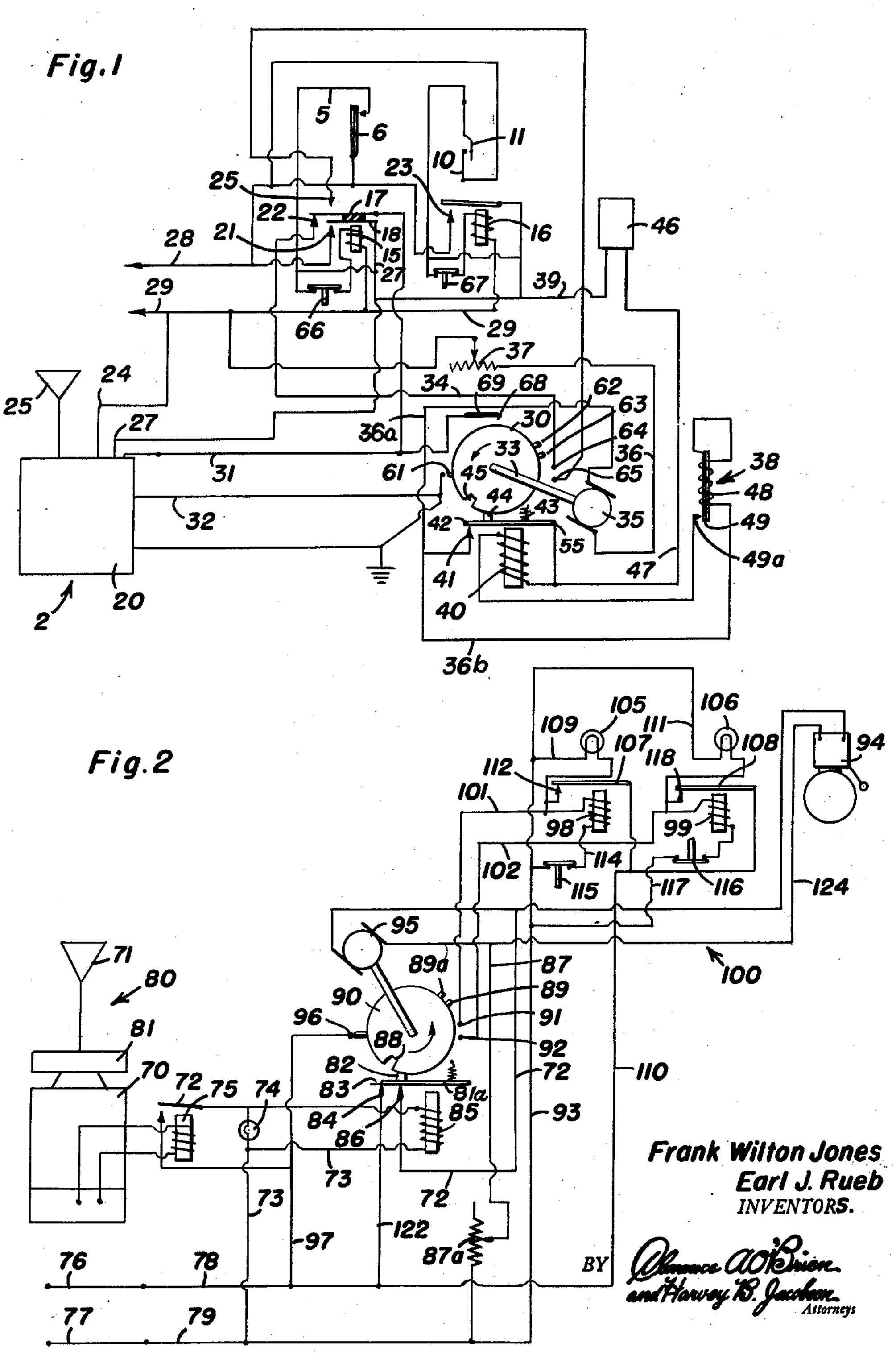
Figure 1 is a diagram of the connections of a transmitter.
Figure 2 is a diagram of the connections of a receiver.

As seen in Figure 1 each protected area has an alarm circuit 5, operated in the case of fire and containing the desired number of customary temperature responsive elements 6 which may be of any desired type but which are indicated in a diagrammatic way in Figure 1 as simple bimetallic strips, it being understood that these fire alarm circuits are not part of the invention and that any type of alarm circuit, and any number of elements, operable by a raise of the temperature, by smoke or by flames may be used. Moreover, the diagram shows an open fire alarm circuit closed upon outbreak of a fire, but it is also understood that this is no particularity to be associated with the invention and that a closed fire alarm circuit opened by the heat responsive elements may be used as well, the customary relay associated with such a circuit being arranged in place of and performing exactly the function of the thermo responsive element 6 within the arrangement diagrammatically shown in Figure 1.

Further, a burglar alarm circuit 10 is provided in some or all of the protected premises or areas containing a number of burglar alarm contacts 11 of any kind. The contacts, in the example shown are also closed when the premises are entered illegally, such closure being, for instance, effected either magnetically or electrically or by means of a photo-electric cell. Also in this case, instead of an open alarm circuit a closed alarm circuit with an alarm relay falling back upon opening of the alarm contact, as customary, may be substituted. Each of the alarm circuits 5, 10 includes an alarm signal relay 15, 16 the energization of which causes the transmitter 20 to operate. The alarm circuits may be provided with normally closed manual switches 66, 67 in order to put them out of operation manually if so desired.

The transmitter 20 of the transmitting station 2 may be of any approved type, for instance, a crystal operated transmitter operating on a definite short wave frequency with a keying means sending out continuous waves (C. W.) of a predetermined frequency when the keying circuit is closed, may be used. The radiation of the C. W. is effected by means of the antenna 25. Power for the operation of the transmitter is supplied by means of the two feed lines 24, 27 which are directly or indirectly connected with the power lines 28, 29 leading to the source of electrical energy which may be a local A. C. network or a power pack producing D. C. which is operated either by a network or by a local generator. The transmitter is keyed by means of the keying lines 31, 32 through which the keying impulses are delivered.

As above stated, each of the two alarm circuits 5, 10 includes an alarm relay 15, 16 respectively which is energized whenever the alarm contacts 6, 11 respectively are closed in the circuits 5, 10. The alarm relays 15, 16 control operative contacts 21, 22 and 23 respectively, the contact 21 supplying the transmitter 20 with power from the power lines 28, 29 so that it will be ready to transmit immediately electromagnetic signal waves as soon as the keying circuit 31, 32 is closed.

The keying circuit 31, 32 by means of which the transmitter emits signal waves is controlled by the relay armature 17 which, when operated, connects the keying circuit line 31 with a fixed operative contact of a station identification or code wheel or drum 30.

The code wheel or drum 30 which forms the main station identification member (Figures 3 and 4) is driven by a shaft 33 which in its turn is rotated by driving motor 35. In the diagrams of Figures 1 and 2 the electric motors are shown as being directly mounted on shaft 33, but as seen from Figure 3 gear wheels are interposed which are not shown in the diagrams for the sake of clarity. The energizing circuit 36 of the electric motor 35 includes an adjustable resistance 37 permitting an exact regulation of the speed of revolution, which as will be explained below, has to be synchronized with the speed of the electric motors of the other units of the system.

The energizing circuit 36 moreover includes the contacts 41, 42 of a locking relay 40 the armature 43 of which is provided with a locking tooth or projection 44 adapted to engage an indentation or notch 45 on a disk fixedly connected with the code drum or wheel 30 or on a part of said wheel. The armature, by means of a spring (see Figures 3 and 4), is always forced toward the disk so that the tooth 44 enters the notch or indentation 45 when the relay 40 is not energized.

The energizing circuit of the relay 40 includes the contacts 18 and 21 of the alarm signal relay 15 so that the locking relay 40 is always energized when an alarm signal relay closes its contact upon the occurrence of dangerous conditions in the area or on the premises supervised by the alarm circuits 5, 10.

As above stated the drum 30 is permanently locked in its position as long as the relay 40 is not energized. When the relay is energized the contacts 41 and 42 are closed and the tooth 44 is withdrawn from the notch 45. Thereby the drum 30 is relieved and simultaneously the energizing circuit of the motor 35 is closed over 29, 37, 36, 35, **36*a*, 36*b*, 48, 49, 49*a*, 40, 47, 46, 39, 18, 21, 28 so that the drum starts to rotate instantly, starting always from the same position which is determined by the position of the notch 45**.

A time switch, generally indicated at 38, and shown as a thermoresponsive switch, may have a contact **49*a* cooperating with the thermoresponsive device 49 in the energizing circuit of the relay 40. The thermoresponsive element 49 is heated by a coil 48 which is in series with the connection between the motor 35 and one of the power lines 28. The driving motor is therefore supplied with current over said heater coil and, after a predetermined period, the heater coil 48 heats the thermoresponsive element 49 to a sufficient degree to separate the contacts 49*a*** from contact with the thermoresponsive element, thus interrupting the further energization of the electric motor.

It will thus be seen that the driving motor after a predetermined period is stopped, this period being selected in a suitable manner. During this period of stopping the thermoresponsive element cools sufficiently to make again contact (at 49) thus energizing the electric motor 35 again. The intervals may be so selected that they are coincident with one revolution of said code wheel or drum 30. The circuit 39, 47 also contains the delaying device 46, which consists of a customary type of relay with sluggish response, permitting the circuit of the motor to close only after 20–50 seconds, which correspond to the heating period of the transmitter. Therefore no signal can be given during this heating period.

Figure 3:
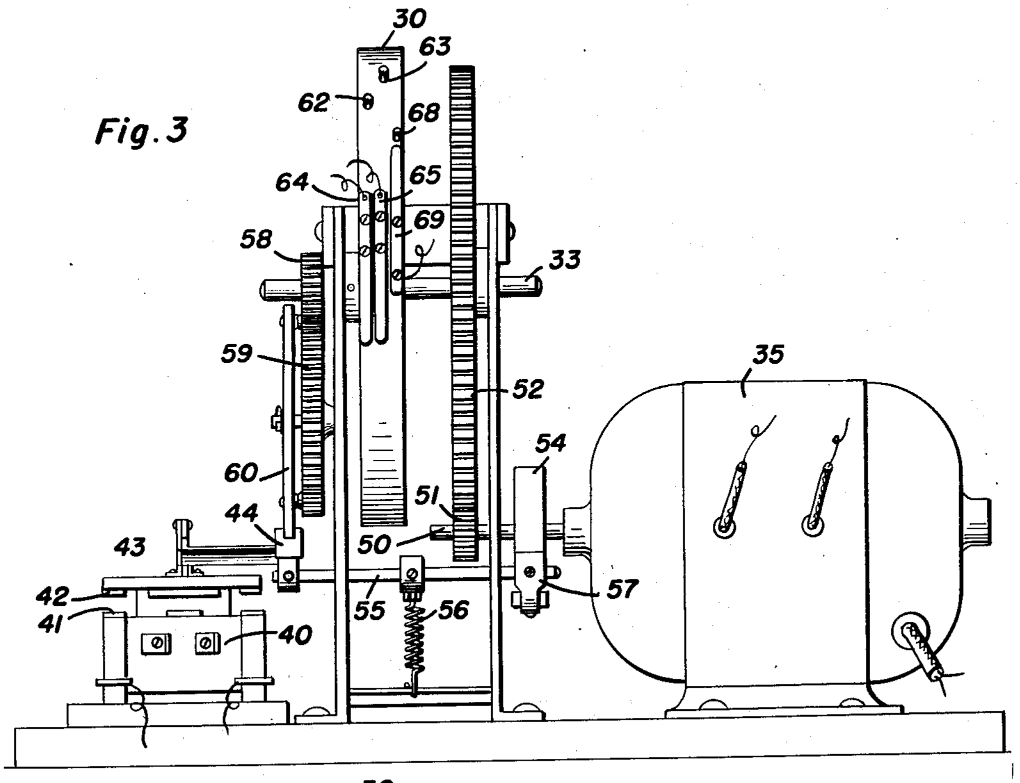
Figure 3 is an elevational view of the moving parts of a transmitter.
Figure 4:
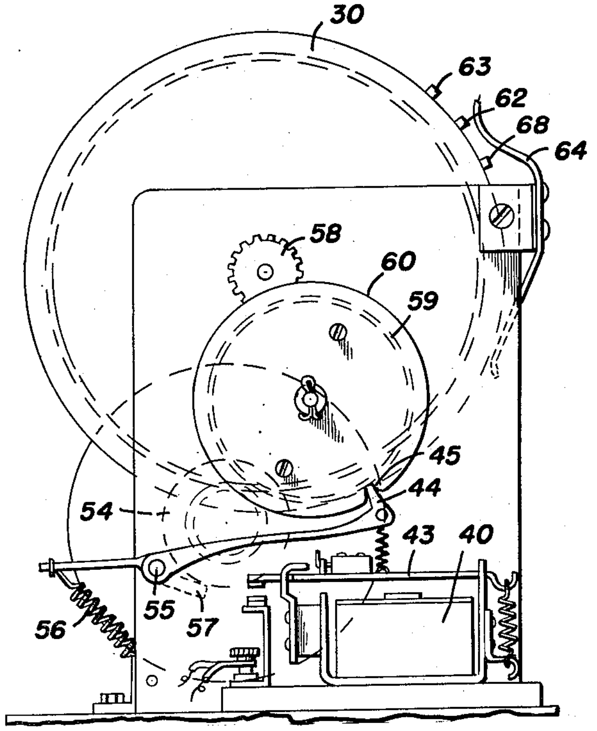
Figure 4 is an elevational side view of the moving part of the transmitter at right angles to the view shown in Figure 3.

The construction of the identification means of the code wheel or drum 30 and those parts which are associated with it are best shown in Figure 3. As seen in this figure the electric motor 35 may turn at a relatively high speed and drives the pinion 51 meshing with the gear wheel 52 which is keyed on shaft 33 and drives the shaft and thereby the drum 30. On the shaft 50 of the motor a brake drum 54 may be mounted which is operated by a brake shoe 57. This brake shoe is operated simultaneously with the operation of the locking device 44, 45 of the locking relay 40, both devices being preferably carried by a shaft 55 which also carries the armature 43 for the relay 40. The shaft 55 is urged to rock in one direction by the spring 56 attached to an arm carried by the shaft on one side and by the frame on the other side, the arm being so attached that the tooth 44 carried by an arm connected with the armature 43 is urged towards the disk 60 for engaging notch 45. When the disk or code wheel rotates the tooth 44 slides on the disk or code wheel and is thus held in a position in which the contacts 41, 42 are closed. When the shaft is in the position of rest the brake shoe 57 is applied against the brake drum 54 and the brake shoe is therefore released when the relay 40 attracts its armature 43.

While in the diagram the armature 43 of the locking relay 40 is shown to lock said code wheel or disk directly it is preferable, as shown in Figure 3, to provide a separate disk 60 for this purpose which is driven by the shaft 33 by means of gear wheels 58 and 59. The gear wheels must be so chosen that the disk 60 rotates at a lower rate than the code wheel. A plurality of notches or indentations 45 may be provided in the disk if the rate at which it rotates is slow. As seen from the figures the tooth 44 is pulled out of the notch 45 and simultaneously the brakes of the motor are released and the contacts 41 and 42 are closed by the armature 43 when attracted by the relay 40.

The surface of the wheel 30 may be of metal or it may be covered by a metal ring on which a brush 61 slides. The said brush and the peripheral portion of the wheel or drum is therefore connected with the conductor 32 of the keying circuit of the transmitter. From said peripheral and conducting portion of the drum or wheel 30 a synchronizing pin 68 and two contact pins or two brushes 62, 63 project outwardly. These contact pins are located at different axial distances from the margin of the drum. During the rotation of the wheel or drum 30 they come into contact with and slide on the inside of the contact shoes 69, 64, 65 respectively which are all arranged in a definite angular position with respect to the notch 45 near the periphery of the drum or disk 30.

The contact pin 68 when coming into contact with the brush or shoe 69 closes the keying circuit and, while passing under said shoe transmits a short keying impulse. As will be described below this impulse initiates the operation of the receiver drum which starts to turn. If the synchronizing contact is arranged in a properly selected angular position with respect to the keying contacts 62, 63, and the notch 45 the arc traversed by the drum after the synchronizing signal has been given will always be the same and will, as explained below, also be equal to the arc through which the receiver drum has moved from its position of rest when the transmitter starts to send signals.

The contact springs or shoes 64, 65 are only diagrammatically indicated in Figure 1. It will however be understood that when for instance, say contact pin 62 makes contact with spring or shoe 64 the keying circuit of the transmitter 20 is closed, the circuit including the keying conductor 31, the contacts 17 and 22 of relay 15 which is energized in the event of a fire alarm the contact shoe 64, further the contact pin 62 the periphery of the drum, the brush 61 and keying conductor 32. A train of C. W. is radiated by means of the antenna 25 during the period of contact between 62 and 64 during which the keying circuit is closed.

It will be understood that this signal is only emitted while the contact drum or wheel 30 is in a certain angular position which in the transmitter is defined by the angle between the contact spring or shoe 64 and the notch 45 defining the position of rest. This angular position is characteristic for the station from which the signal is radiated and it therefore varies from station to station. The timing of the synchronization impulse emission is defined by the position of said contact pin and its brush with which it cooperates and the angular position of both elements must be so chosen that the angular movement performed between the contact of the synchronization contact with its brush and the contact of signal contact pin 62, 63 with its brush or shoe corresponds to the relative angular position between the notch and the corresponding contact in the receiver.

The electric motor 35 is of the type permitting accurate and complete synchronization. It is for this purpose that the resistance 37 is provided which provides means to make an adjustment in the event that the synchronization should not be perfect. As a rule, the transmitter and receiver motors all operate on the same urban network and therefore by selecting a suitable type of motor no difficulties are experienced to obtain perfect synchronization.

While the transmitter arranged on the protected premises or in the protected areas starts to operate merely in the event that one of the alarm circuits has been closed, in order to indicate the presence of dangerous conditions, the receiver 80 shown in Figure 2 is a permanently operating unit located in an attended and supervised exchange office. The radio equipment of the receiver must therefore be permanently in a stand-by condition ready to receive signals. The other equipment of the receiver station which is not directly connected with the reception of electromagnetic waves may however be controlled by the receiving equipment which is operated by the broadcast signals.

The receiver is provided with an antenna 71 and may include a band-pass filter 81 in order to eliminate all frequencies except the frequency or frequency band with which the transmitters operate. All other frequencies should be rejected in order to prevent accidental operation of the alarm. The receiver moreover contains the customary radio frequency circuits and amplifying and detecting equipment indicated at 70 all this equipment being conventional. The receiver may also be equipped with an automatic volume control marked A. V. C. so that the rectified energy which is used for operating the alarm detecting and identifying devices of the receiver is always practically the same.

The incoming energy after amplification and rectification operates the relay 75 which starts the operation of the alarm equipment as soon as it is energized. This relay 75 is provided with an armature or with armatures 72 controlling the local circuit of the locking relay 85 of the receiver which in many ways is similar to the locking relay 40 of the transmitter and which is supplied from a source of current which may be either an A. C. network or a power pack operated by said network or by a special generator. This source of current is indicated in the figure as being connected with the terminal 76 and 77 of the two power lines 78 and 79.

Across the locking relay and the operating circuit of the same a pilot lamp 74 may be arranged which, by virtue of this connection, is energized whenever the relay 85 is energized and when the energizing circuit of the locking relay 85 of the receiver is closed. This lamp draws attention to the fact that one of the transmitters or several of them are operated. It is therefore part of the optical arrangement which is provided in order to warn an attendant that an alarm has been given by one of the stations of the system.

When the locking relay 85 has been operated by the relay 75, closing its armature upon reception of the first or synchronizing wave trains, the armature 81 of the relay is attracted which armature is provided with a tooth 82 engaging a notch or indentation 88 on a disk which is connected with a signal receiving drum 90 or is part of the drum 90. The drum 90 is again driven by a motor 95 the energizing circuit of which is controlled by the contacts 84, 86 which are controlled by means of the contact spring 83 attached to the armature of the relay 85. As described in connection with drum 30 the armature 83 once the drum has started to rotate is kept in its contact position closing contacts 86, 83, 84.

Upon energization of the relay 85 the tooth 82 is withdrawn from the notch 87 which it has engaged and therefore the drum 90 is released and the motor 95 is started. The energizing circuit of the motor 95 includes the two contacts 84 and 86 and further also includes the conductors 72 and 87, the latter containing a resistance **87*a* for the purpose of adjusting the synchronization of the electric motor 95 with the motor 35** of the transmitters.

The station identification means of the receiver station comprises on the one side the receiver code wheel or drum 90 with its associated parts to be described which performs the identification of the station and the annunciator or indicator means which indicate the correct station to the attendant. The annunciator or indicator means 100 comprise in addition to signals which announce the incoming of an alarm in any station, individual signal indicating means, such as lamps 105 and 106, allotted to each transmitter, one lamp 105 being operated when the circuit 5 for instance in the transmitter station is closed, indicating a fire alarm, the other lamp 106 being closed when the burglar alarm circuit 10 in the transmitting station is operated. Therefore each transmitter on the indicator board is represented by as many indicator signs or lamps as there are alarm circuits operating in the transmitter and if these indicator lamps are properly disposed on the indicator board it is possible to tell at a glance not only in which of the protected premises the alarm signal originated but also which one of the alarm circuits operated the signals. The signal on the indicator board, generally indicated at 100, is given by means of the conductor 93 and by means of relays indicated at 98, 99 allotted to each individual indicator signal. In addition, a general signal 94 is provided which is preferably an acoustical signal such as a buzzer or an alarm bell and which may be connected in multiple with the relay armatures operated by the individual station, or which is, as shown, connected with the energizing circuit of the motor 95 and operate whenever the motor is energized. Therefore if any one of the stations broadcasts an alarm the circuit of the signal 94 is closed, in addition to the pilot lamp 74, and the pilot lamp lights while the buzzer produces an acoutic signal drawing the attendant's attention to the fact that an alarm has been given.

The identification of the station which has broadcast an alarm signal is essentially produced by means of the code drum 90 running synchronously with the code wheels of the transmitter stations. This code drum, as used in the receiver, is of the same construction, on principle, as the code wheel of the transmitter, except that the code wheel in the receiver has as many sets of contacts as there are transmitter stations and has no synchronization pin and brush. These sets of contacts may be distributed around the periphery or may be distributed axially along the drum and the drum may therefore be of considerable width in order to accommodate a large number of station contacts. Manifestly, the code drum must be of such size that a certain and definite angular position may be assigned to each set of contacts.

In the example shown, a pair of contact pins 89, 89*a* is provided for each transmitter on the contact drum 90 and likewise a pair of contact shoes or contact springs 91, 92 is arranged close to the periphery of the contact drum, occupying an angular position on the drum relatively to the notch 88 which corresponds exactly to the relative angular position of the contact position between corresponding contact pin 62 or 63 and contact shoes 64 or 65 and the contact position of synchronizing contact 68 and contact shoe 69.

The surface of the code drum 90 is again conducting or has a conducting portion or a number of conducting portions upon which a brush 96 slides which brush is connected by means of conductor 97 with one of the power lines 78.

Each fixed contact shoe or contact spring 91, 92, corresponding to a fire alarm and to a burglar alarm contact respectively of a definite transmitter station, is connected with and operates a relay 98, 99 on the indicator board 100, as soon as the pin 89, 89*a* passes or slides on one of the contact shoes or springs 91, 92. As above stated there are as many indicator relays as there are contact shoes around the drum and contact pins on the drum and the circuit of the relays includes the conductor 93 which is connected with the power line 78 and also contains the two conductors 101 and 102, leading to the two contacts shoes 91, 92 respectively which are allotted to the same transmitting station, but to different alarm circuits of said station. These circuits are completed by the pins 89, 89*a* which are connected by the conducting surface of the contact drum with the brush 96 and its conductor 97 leading to the power line 78.

When contact is made between one of the pins 89 and the contact shoe 91 for example, the relay 98 operates and the armature 107 of the relay closes contact 112 and thereby the circuit 109 of the lamp 105. This circuit is on the one hand connected by means of conductor 93 with the power line 79 and is, on the other hand, connected by means of conductor 110 with the power line 78. The circuit 114 of the relay may contain a normally closed push button switch 115 permitting to extinguish the lamp 105 when the proper report has been made about the alarm.

Relay 99 is similarly connected with the power lines by means of conductor 97, the brush 96, the contact pin 89*a*, the contact shoe 92 allotted to the burglar circuit of the transmitter station and circuit 117. When contact 118 is closed by means of armature 108 the lamp circuit 111 is closed over lamp 106 in the same way as has already been described in connection with lamp 105. Each relay has a holding circuit holding the relay in its energized position and thereby keeping the lamp burning until the normally closed switch 115, 116 is operated which interrupts the holding circuit. It will be understood that such a holding circuit is arranged on every one of the relays of the indicator table 100.

*Operation*

The operation of the alarm system will be easily understood from the above description. Maintenance personnel of the system has to adjust the motor 35 of the transmitters and the motor 95 of the receiver for absolute synchronism, but once this adjustment has been performed there is no further maintenance work to perform except an occasional inspection, the replacement of a battery, if any, and similar work connected with every electric line.

Let it be assumed now that a fire alarm originates in transmitter station 2 shown in Figure 1 which is an installation on unguarded unattended premises, then the thermo responsive element 6 of the fire alarm circuit 5 closes the alarm circuit 5 and thereby energizes the relay 15. Relay 15 closes contacts 18 and 21, thus providing the transmitter with power over lines 24 and 27 and energizing relay 40. The circuit of relay 15 upon closing of the fire alarm circuit may be traced over conductor 28 to the thermo responsive element 6 of the circuit 5, the switch 66, the winding of the relay 15 to the power line 29. The circuit providing the transmitter 20 with power may be traced from power line 29 over conductor 24 to the transmitter and from power line 28 over contacts 21 and 18 of relay 15 and line 27 to the transmitter.

Simultaneously with the providing of the transmitter with power the keying circuit of the transmitter is closed except for the contacts 68, 62 and 64 and also the energizing circuit of relay 40 is closed. The keying circuit of the transmitter is closed at contacts 17 and 22 of the relay 15 which are connected with keying line 31 which line over said contacts is connected by means of conductor 34 to the contact shoe 64. The other half of the circuit runs over keying line 32 and brush 61 and over the metallic surface of the drum 30 to the contact pin 62. No contact is made for the moment closing the keying circuit, because contact pin 68 is still at a distance from contact shoe 64 when this operation occurs.

It has already been stated that simultaneously with the energizing of the transmitter the relay 40 also was energized, the circuit in this case running from power line 28 over contact 21, armature spring 18, a section of conductor 27 and over conductor 39 the time delay device 46, conductor 47, relay 40, contact 49*a*, bimetallic member 49 and winding 48 of the device 38 and over line 36*b*, 36*a*, motor 35 and line 36 back to the power line 29.

The energizing of the relay 40 produces the movement of the armature 43 and thereby also of the shaft 55 so that the brake shoes are removed from the motor 57 and the tooth 44 is disengaged from notch 45. The attraction of the armature 43 also closes the energizing circuit of the motor 35 not containing the relay winding the circuit being traceable from power line 29 over resistance 37, energizing circuit 36 to the contacts 41 of relay 40, the armature contact 42 of the same relay and conductor 47*a* back to power line 28. The motor thus after a short delay caused by the device 46 rotates, the brakes are released, and the code wheel is likewise released and may rotate with the motor 35. When the motor rotates, contact pin 68, after a certain angular movement performed by the code wheel, rides over the contact shoe or spring 69 and, as already explained above, the keying circuit of the transmitter is thereby closed for a short time as both branches of the keying circuit have been closed before as described. The closing of the keying circuit 31, 32 produces a synchronization impulse signal which is now radiated by the antenna 25 and, as will be seen from the above explanation, such radiation of the signal takes place in a definite angular position of the code wheels 30 of the transmitter.

The synchronizing impulse is received in station 80 and relay 75 is operated closing its armature contact 72 and energizing relay 85 over circuit 79, 73, 85, 72, 97, 76, thereby also energizing motor 95 by the closing of contacts 83, 86 of the relay. The motor circuit runs from 79 over 87*a*, 87, 95, 72, 86, 83, 84, 122 to 78. Simultaneously, the brake 54 is released. From this point on the two electric motors 35 and 95 running in synchronism perform equal angular movements within the same period of time. The contact 89*a* is so arranged that it contacts its brush or shoe 91 after performing an angular movement corresponding to the arc between the position of rest (defined by the position of notch 88 when engaged by tooth 82) and the position of contact between 89*a* and 91 in the direction of rotation. This arc is equal to that passed by contact 62 from its starting position to its contact position, the starting position being however defined by the pointer, said contact 89, 62 occupies when the synchronization contact 68 sweeps over its contact brush or spring 69.

The signal produced in the transmitter which, as will be remembered, was a signal produced by the thermo responsive element 6, now comes in at the receiver antenna 68, is amplified and rectified in the receiver and operates relay 75 which closes its contact 72 thus energizing relay 85 controlling the movement of the code drum 90 of the receiver. The energizing circuit of relay 85 has already been traced from power line 79 over conductor 73, relay 85, the armature 72 of relay 75 and conductor 97 to power line 78. In addition to the energization of relay 85 the pilot lamp 74 which is in parallel to the relay is energized. The attendant is thereby notified that an alarm signal has been given by one of the transmitter signals.

The further energization of the relay 85 produces no further effect on armature 81a which is held in its position by the drum.

It will be understood that the drums start to rotate at a given predetermined position at the moment at which the synchronization signal comes in and therefore the angular relation between the drums of the transmitter of the receiver station remains a fixed one, as the signal is given in a definite angular position of the transmitter after the starting impulse. The contacts 89, 89a and 91, 92 must be so distributed around the drum that when a signal comes in this signal can only be received over a single one of the series of contacts 91, 92 of which there are as many on the drum as there are transmitters.

Only one pin 89 is therefore in contact with the contact shoe or spring 91 when the signal is received and therefore operates the relay 98, thus identifying the transmitter by selecting a definite relay and a definite lamp of the indicator 100. When the relay 98 has been operated the lamp 105 is lighted, as already described, the circuit of the relay and of the lamp having already been traced when describing these elements. Simultaneously with the operation of one of the relays also an acoustic signal 94 is operated the circuit of the acoustic signal being traceable from power line 79 over conductors 87, 124 and the acoustic signal 94 to line 72 which is connected with power line 78. Therefore a double signal, namely a visual and an auditory signal is given whenever an alarm comes in and, after a short pause, the indicator by lighting one lamp identifies the station on which the alarm signal originated.

Referring now again to the operation of the transmitter it has been explained that the relay circuit of relay 40 includes the contact 49a of the contact device 49 and it has also been described that the device 49 is a thermo responsive device which is operated by a heater coil 48 which is included in a branch 36b of the circuit of the motor 35. This thermoresponsive device has merely the function of a timing device adjusted in such a way that during each revolution of the code wheel or drum it heats up sufficiently to separate the contacts 49a from the member 49. Therefore, after each revolution of the code wheel the relay is automatically de-energized and the motor 35 ceases to operate while the brakes are applied and the tooth 44 locks the disk 60 connected with the drum 30. The electric motor and thereby the code wheel stops for a number of seconds or minutes which have been prescribed. During this pause it is possible to receive other signals, which may have originated from some other transmitter stations, in the receiving station and the device indicated at 38 is therefore specifically designed to allow each station to come through to the receiving station regardless of whether a number of other stations are on the air or not. An obliteration of signals sent by one station to another station is thus prevented, or if it should occur during the sending the attendant has merely to wait for the pause in order to be able to hear the signals unimpaired by other signals.

The pause which is to be made in the transmission of signals in each transmitter may be adjusted individually so that the attendant may in the case of an emergency identify the station by the length of the pause and by its relation to the signal. When the alarm circuit is again closed after the pause, the transmission starts again as described.

The operation of a burglar alarm circuit is exactly similar except that relay 16 closes the circuit to contact shoe 65. To exclude simultaneous operation of both alarm circuits the circuit of contact shoe 65 may include the rest contact 125 of relay 15.

It is thus seen that the system according to the invention permits the transmission of alarm signals by means of equipment of the simplest kind which is the same for all transmitting stations, that only a single frequency is used for all the signals while nevertheless a complete identification of all the signals sent by the various stations in the case of alarm is possible by means of the code wheels or code drums, notwithstanding the fact that all transmitter stations are using exactly the same means and exactly the same wave length for the broadcasting of a signal.

It will be clear that the equipment, and especially the non-essential portions of the equipment may be changed in many ways without departing from the essence of the invention as defined in the annexed claims.

Having described the invention, what is claimed as new is:

1. An automatic alarm system including a wireless transmitter station on each of a number of protected premises, operable by alarm contacts included in alarm circuits and further including a central wireless attended receiver station, comprising a keying circuit in each transmitter station, keying the transmitter so as to produce a signal transmission when closed, a rotating code wheel in each transmitter station provided with a contact arranged in a fixed angular position in the position of rest of the code wheel and cooperating with a field contact, means for driving said code wheel at a definite constant speed, said code wheel contacts controlling the keying circuit of the transmitter station, means for arresting said code wheel of each transmitter station at predetermined time intervals for a predetermined period of time, said means including an automatic current operated timing device adjusted for operation at predetermined intervals of current flow, and provided with contacts, said contacts controlling the means for driving the code wheel.

2. An automatic alarm system as claimed in claim 1, wherein the means for driving the code wheel consists in an electric motor and in an energizing circuit for the same, and wherein the automatic timing device consists in a thermoresponsive device arranged in the energizing circuit of the electric motor.

3. An automatic alarm system as claimed in claim 1 wherein the means for operating the code wheel of a transmitter station comprise a locking mechanism for locking the code wheel in a predetermined position, a relay for controlling said locking mechanism, an operating circuit for said relay, an electric motor and an operating circuit therefor, the latter being controlled by the said relay and wherein the automatic current operated timing device comprises a thermoresponsive device with an operating heating coil and with contacts operated by the said thermoresponsive device, the heating coil being arranged in the operating circuit of the electric motor and the contacts of the thermoresponsive device being arranged in the operating circuit of the relay of the locking mechanism.

4. An automatic alarm system with a central attended receiving station and with a transmitter station allotted to each of the protected premises, comprising a rotary station identification device in the receiving station, in each transmitter station an alarm circuit provided with alarm contacts, a rotary station identification device controlled by said alarm circuit and a signal producing keying means with the keying circuit normally open, but closed by the said rotary station identification device upon operation by an alarm circuit, the said rotary station identification device in the transmitter including a rotating code wheel provided with a contact arranged in a predetermined angular position with respect to the position of rest of the code wheel, said contact cooperating with a fixed contact, means for driving said code wheel at a definite constant speed, said code wheel contacts controlling the key circuit and producing a synchronization impulse starting the operation of the rotary station identification device in the receiver, a second contact on said code wheel and a second fixed contact cooperating with the said second contact on the code wheel, having a definite angular position relatively to the said first contact and the said second contact on the code wheel and fixed contact, and upon operation of the alarm circuit, closing the keying circuit to produce the emission of an alarm signal, a rotating receiving code drum in said central receiving station, forming part of the station identification device of said station, a contact on said code drum for each transmitter station, each contact having a definite angular position relatively to all other contacts, a fixed contact near each contact drum, cooperating with the contact on the said drum, means for driving said rotating code drum in the receiver station at a speed synchronous with the speed at which the transmitter code wheels are driven, an alarm indicator with an alarm indicating circuit and an alarm signal for each transmitter station in the attended central receiving station, said alarm indicating circuits being connected with the fixed code drum contacts of the receiving station and with the contacts on the code drum, the individual transmitting station transmitting keying impulses identified by the position of the contacts of the rotary code drum through which the said signal impulse is received, and means for arresting the station identification device of each transmitter station at predetermined intervals for a predetermined period to produce a transmission pause during which signals from other stations may be received.

References Cited in the file of this patent

UNITED STATES PATENTS

| | | |
|---|---|---|
| 1,689,294 | Potts | Oct. 30, 1928 |
| 2,063,890 | De Neergaard | Dec. 15, 1936 |
| 2,168,460 | Watson | Aug. 8, 1939 |
| 2,332,774 | Bell | Oct. 26, 1943 |
| 2,567,226 | McWhirter | Sept. 11, 1951 |